May 5, 1931.   H. F. L. J. ROCHERON   1,803,438
HINGE
Filed July 12, 1929
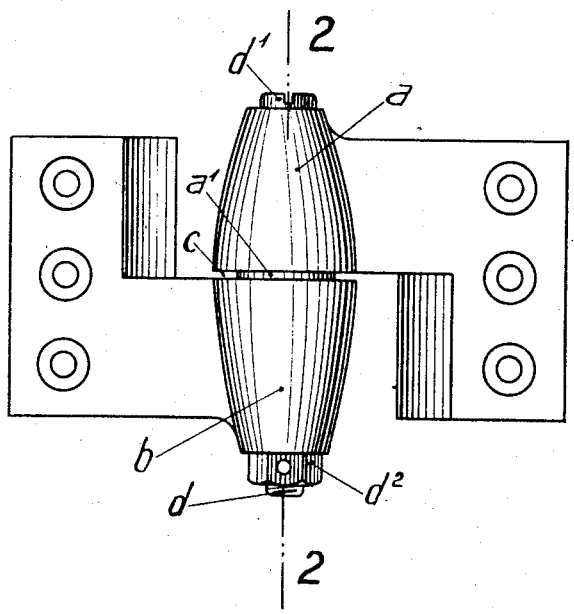
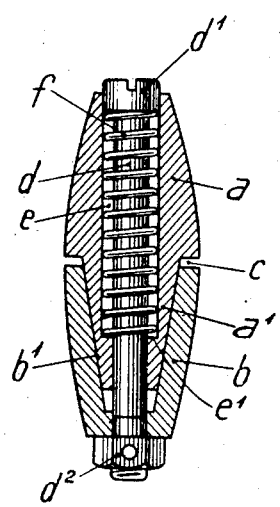
Inventor
Henri François Louis Joseph ROCHERON
By Addison A. Armstrong
His Attorney Patented May 5, 1931

1,803,438

UNITED STATES PATENT OFFICE

HENRI FRANCOIS LOUIS JOSEPH ROCHERON, OF LEVALLOIS-PERRET, FRANCE

HINGE

Application filed July 12, 1929, Serial No. 377,889, and in France October 30, 1928.

The present invention relates to hinges and, more particularly, to those adapted to be used on automobiles and similar vehicles.

One of the objects of the invention is to provide means for automatically taking up wear in a hinge assembly.

Other objects of the invention will be obvious to those skilled in the art from the following description when taken in connection with the accompanying drawing forming part of this specification and in which:—

Fig. 1 is an elevational view of my improved hinge in open position;

Fig. 2 is a section along the line 2—2 of Fig. 1.

Referring to the drawing more in detail wherein similar parts have been given like reference characters, $a$ and $b$ designate the two hinge members pivoted together. Member $a$ is provided with an extension $a^1$ of conical form pivotally engaged in a corresponding truncated recess $b$. A slight space $c$ exists between the two parts $a$ and $b$ and allows the two members to approach each other as fast as the surfaces of the compensating elements $a^1$ and $b^1$ become worn. The two parts $a$ and $b$ are assembled by a pintle $d$ having a head $d^1$.

Members $a$ and $a^1$ are pierced axially by a channel $e$ allowing the free passage of the head $d^1$ of pintle $d$. Near the end of cone $a^1$ the said channel is made smaller so as to form a flange $e^1$. Pintle $d$ axially traverses the two parts $a$ and $b$. A spring $f$ positioned in channed $e$ bears at one end on flange $e^1$ and at the other end on the under side of head $d^1$ of the pintle. The assembly is completed by a nut $d^2$ maintaining spring $f$ in position.

In Figs. 1 and 2, the shaft $d$ traverses the extremity of the member $b$ and the end of the said shaft or pintle is provided with a retaining nut $d^2$.

Having described my invention what I claim as new and desire to secure by Letters Patent is:

A hinge comprising a male member having a tapered projection thereon, said tapered projection having a rectilinear lateral surface,—a female member having a tapered recess formed therein, said recess having a rectilinear lateral surface adapted to coact with the lateral surface of said projection,— a pintle traversing said male and female elements and operative to maintain said male and female members in assembled relation,— and a spring operative to oppose separation of said male and female members, said spring bearing against part of said pintle at one of the extremities thereof.

In testimony whereof I hereunto affix my signature.

HENRI FRANCOIS LOUIS JOSEPH ROCHERON.